(12) United States Patent
Ito et al.

(10) Patent No.: US 7,044,490 B2
(45) Date of Patent: May 16, 2006

(54) STRUCTURE OF FRONT FORK

(75) Inventors: Shinji Ito, Saitama (JP); Seiji Yamaguchi, Saitama (JP); Terunari Saiki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 103 days.

(21) Appl. No.: 10/885,131

(22) Filed: Jul. 7, 2004

(65) Prior Publication Data

US 2005/0051993 A1 Mar. 10, 2005

(30) Foreign Application Priority Data

Jul. 8, 2003 (JP) .............................. 2003-193811

(51) Int. Cl.
*B62K 25/04* (2006.01)
(52) U.S. Cl. .................... 280/276; 280/304.3
(58) Field of Classification Search ................ 280/276, 280/279, 304.3; D12/126
See application file for complete search history.

(56) References Cited

U.S. PATENT DOCUMENTS 4,138,132 A * 2/1979 Doyle ..................... 280/304.3
4,455,032 A * 6/1984 Kajikawa .................... 280/276
4,676,518 A * 6/1987 Kartchner et al. .......... 280/276
6,837,508 B1 * 1/2005 Francis et al. .............. 280/276

FOREIGN PATENT DOCUMENTS

JP 11-51106 A 2/1999

* cited by examiner

*Primary Examiner*—Lesley D. Morris
*Assistant Examiner*—L. Lum
(74) *Attorney, Agent, or Firm*—Birch, Stewart, Kolasch & Birch, LLP

(57) ABSTRACT

Since a large part of an outer tube is made of light alloy such as aluminum, plating on a surface of the outer tube sometimes peels off. Thus, the surface of the outer tube is generally painted. However, a problem is presented in the external appearance of the outer tube due to painting. A structure of a front fork includes an outer tube into which an inner tube is movably inserted in an axial direction thereof. A stepped part is formed in the outer tube with a third elastic member fitted to the stepped part. A tube cover includes a lower portion which is supported by the third elastic member. Since an outer surface of the tube cover covering the outer tube is plated, the external appearance can be enhanced. Even if the outer tube has a rough surface, light metal castings or forgings can be used.

20 Claims, 14 Drawing Sheets

STRUCTURE OF FRONT FORK

CROSS-REFERENCE TO RELATED APPLICATIONS

The present non-provisional application claims priority under 35 USC 119 to Japanese Patent Application No. 2003-193811 filed on Jul. 8, 2003 the entire contents thereof is hereby incorporated by reference.

BACKGROUND OF THE INVENTION

1. Field of the Invention

The present invention relates to an improvement in a structure of a front fork.

2. Description of Background Art

Techniques are known for improving the structure of a front fork. See, for example, Japanese Patent Laid-Open Publication No. Hei 11 (1999)-51106 (FIG. 4).

FIG. 22 is a view of FIG. 4 of Japanese Patent Laid-Open Publication No. Hei 11 (1999)-51106. Note that the reference numerals have been redesignated.

A dust cover 160 includes, as the main components a stopper 161 fixed on an outer peripheral surface of an inner tube 113, a cover sheet 162 is fitted on the stopper 161 and the dust cover 160 is fitted to the inner tube 113 with the cover sheet 162 interposed therebetween.

The dust cover 160 covers a lower part of the inner tube 113 of a front fork 110. Thus, the dust cover 160 serves as a mudguard.

For example, in a motorcycle, the front fork 110 is a member that includes highly visible exterior components. Thus, it is best for the front fork 110, as the exterior component, to have a pleasing appearance.

Plating is one technique for improving the exterior appearance of the front fork 110. It is preferable to plate the outer tube 112 of the front fork 110 and the outer peripheral surface of the dust cover 160.

Moreover, the outer peripheral surface of the inner tube 113 is similarly plated. Thus, slidability with respect to the outer tube 112 as well as the exterior appearance can be improved.

In addition, in general, a steel pipe is used for the inner tube 113 and a steel pipe or a steel tube is used for the dust cover 160. Meanwhile, for the outer tube 112, a light alloy casting such as an aluminum casting is used in order to achieve a certain appearance and to achieve a weight reduction with respect to the outer tube 112.

When the inner tube 113 and the dust cover 160, which are made of steel, are plated, the adhesion strength of the plating is sufficiently increased.

However, when the outer tube 112, which is manufactured by use of a light alloy casting, is plated, it is discovered that the following problems occur.

The hardness of an aluminum alloy casting (JIS H 5202 AC4C-T61) is about HB (10/500) 90. Meanwhile, the hardness of the Cr plating is HB 450 or more. There is a significant difference in hardness between the aluminum alloy casting, that is the base material, and a plated layer, that is the coating.

Accordingly, when a load is applied to the front fork and the front fork is bent, cracks may be caused in the plating due to the difference in hardness. Thus, when the outer tube, which is made of a light alloy, is plated, it is required to increase the rigidity of the outer tube by use of means for increasing the wall thickness of the outer tube or the like and to form the outer tube to have a shape not to be bent. Consequently, an increase in weight and cost are incurred.

Accordingly, as the second best solution, the adopted of a method of painting the surface of the outer tube is proposed. However, if the outer tube is painted and the inner tube and a duct cover are plated, there is a difference between the appearance of painting and appearance of the plating. Thus, there remains a problem such as a lack of visual uniformity.

SUMMARY AND OBJECTS OF THE INVENTION

Consequently, an object of the present invention is to provide a technology capable of entirely plating the front fork including the outer tube.

In order to achieve the foregoing object, according to the present invention, a pair of inner tubes are inserted into a pair of left and right outer tubes movably in an axial direction thereof. In addition, in a front fork supporting a front wheel, the outer tube is covered with a tube cover and an outer surface of this tube cover is plated.

Since the outer surface of the tube cover which covers the outer tube is plated, the external appearance can be enhanced. As a result, the tube cover, which covers the outer tube, and the inner tube can be plated. Thus, the whole external appearance of the front fork can be integrated.

Moreover, since the outer tube is covered with the tube cover, light metal castings or forgings can be used even if the outer tube has a rough surface.

According to the present invention, the tube cover is attached to the front fork side with an elastic member interposed therebetween.

Since the tube cover is fixed by means of the elastic member, the tube cover is not bent as much as the front fork. As a result, it is possible to prevent the occurrence of cracks and peeling due to bending of a plated layer formed in the tube cover.

According to the present invention, at least one of both ends of the tube cover is attached to a stepped part which the outer tube is provided with.

In attaching the tube cover, the attachment is performed by pressing a part of the tube cover against the stepped part formed in the outer tube.

Therefore, in attaching the tube cover, it is easy to position the tube cover. Thus, assembling efficiency of the outer tube and the tube cover can be improved.

According to the present invention, a convex-concave part is formed on an inner peripheral surface of the elastic member. In addition, convex portions are brought into contact with the front fork side.

On the inner peripheral surface of the elastic member, a spline-shaped convex-concave part is formed. In addition, only the convex portions are brought into contact with the front fork side.

Since only the convex portions on the inner peripheral surface are brought into contact with the front fork side, it is possible to reduce the force required to fit the elastic member into the outer tube. Thus, assembling efficiency can be improved.

Furthermore, it is possible to easily discharge rain water entering between the tube cover and the front fork through the concave portions formed on the inner peripheral surface.

According to the present invention, the front fork is an inverted front fork in which the inner tubes are inserted from below the outer tubes. In addition, a top bridge or a bottom bridge of the inverted front fork fixes one end of the tube cover.

In the inverted front fork, the top bridge or the bottom bridge fixes the one end of the tube cover.

Since the top bridge or the bottom bridge directly fixes the tube cover, it is not required to provide an additional member for fixing the tube cover. Thus, a reduction in the number of items and a reduction in the weight can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
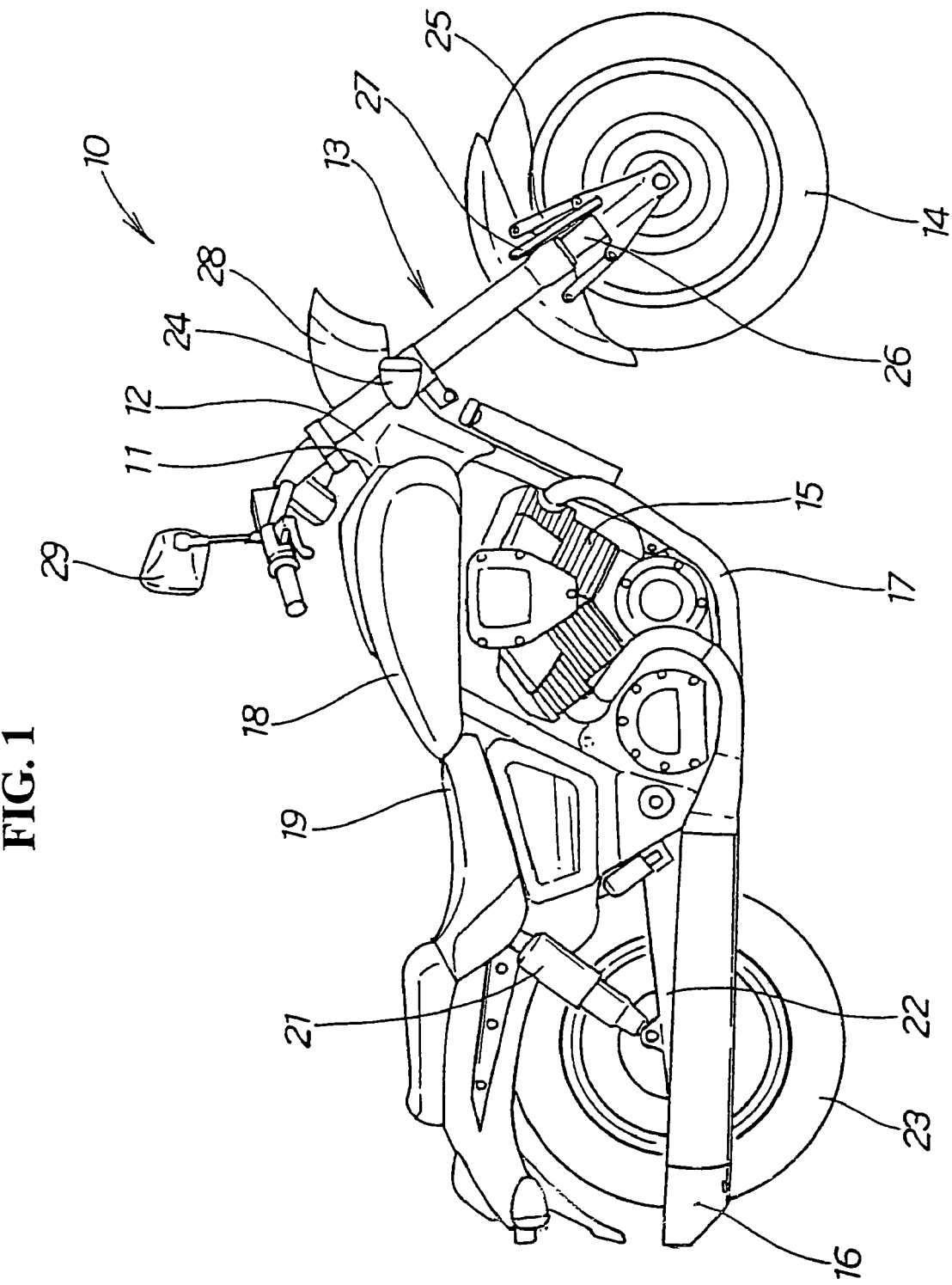
FIG. 1 is a side view of a motorcycle according to the present invention.

Based on the accompanying drawings, an embodiment of the present invention will be described below. FIG. 1 is a side view of a motorcycle according to the present invention. The motorcycle 10 includes a main frame 11 with a front fork 13 that is attached by means of a head pipe 12 so as to be steerable. The head pipe 12 is formed in a front portion of the main frame 11. A front wheel 14 is attached to a lower portion of the left and right front fork 13. An engine 15 is mounted on the main frame 11 with an exhaust pipe 17 through which exhaust gas discharged from the engine 15 flow to a muffler 16. A fuel tank 18 and a passenger seat 19 are disposed in front and rear portions of the main frame 11 with a swing arm 22 attached in the rear portion of the main frame 11 so as to be movable up and down by means of a rear shock absorber 21. A rear wheel 23 is attached to a rear portion of the swing arm 22.

The left and right front fork 13 includes turn signals 24 attached so as to protrude left and right from the front fork 13. Inner tube covers 27 are attached to the left and right sides so as to cover the inner tubes 26 by means of cover brackets 25. A headlight 28 is provided together with a mirror 29.

Figure 2:
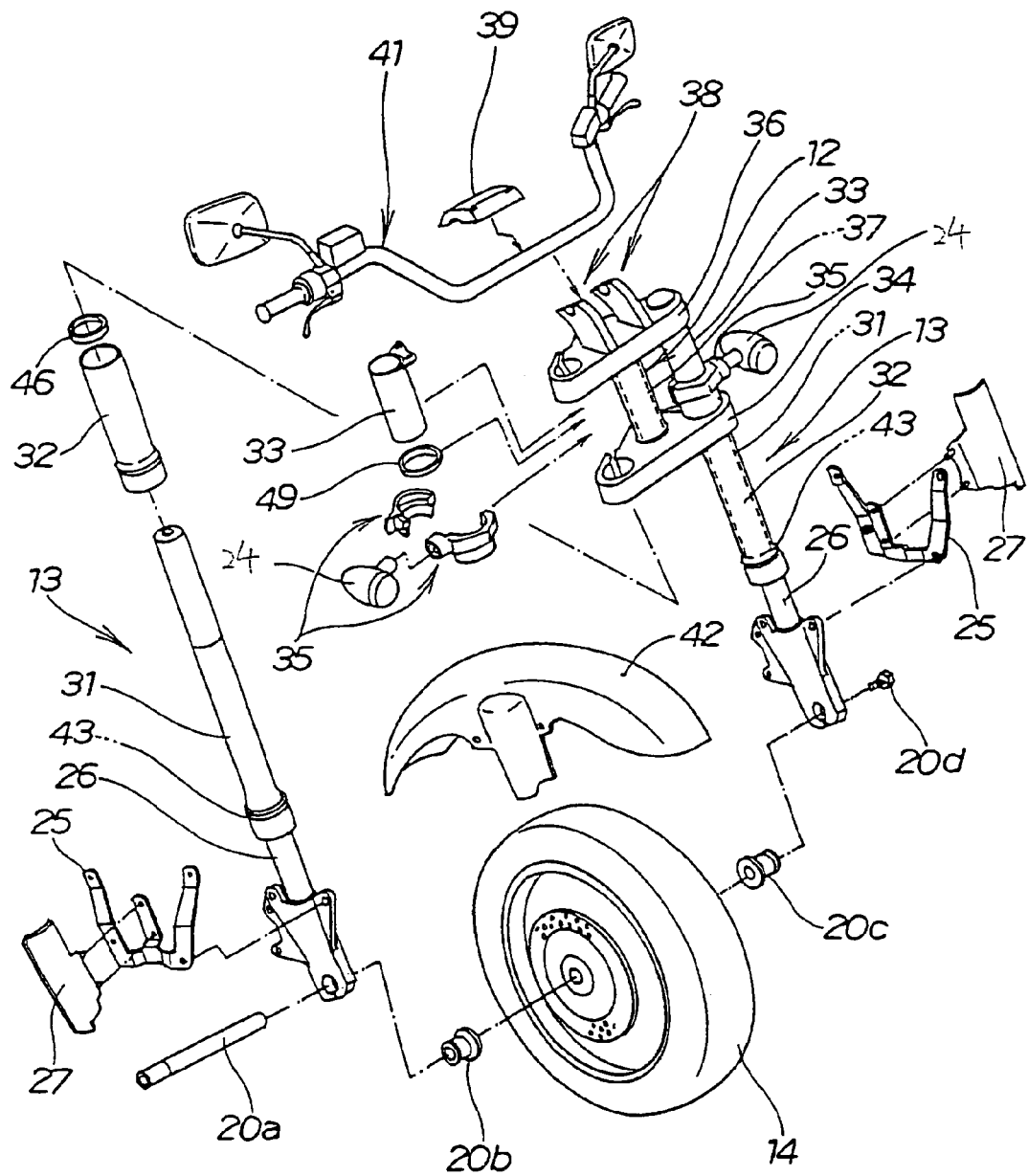
FIG. 2 is an exploded perspective view of a structure of a front fork according to the present invention.

FIG. 2 is an exploded perspective view of a structure of the front fork according to the present invention. FIG. 2 shows that the structure of the front fork is assembled in the following manner. Specifically, the inner tubes 26 are inserted into outer tubes 31 and are movably in an axial direction thereof. Tube covers 32 are put on the outer tubes 31 and a bottom bridge 34 is placed on the tube covers 32. Turn signal brackets 35 are attached on the bottom bridge 34 and a top bridge 36 is placed thereon, the top bridge 36 having upper tube covers 33 fixed thereto.

The head pipe 12 formed in the front portion of the main frame and is put through a stem shaft 37 placed so as to extend upwardly in a vertical direction on the bottom bridge 34. Accordingly, the head pipe 12 is sandwiched by the top bridge 36 and the bottom bridge 34.

More specifically, the front fork 13 is fixed by the top bridge 36 and the bottom bridge 34. In addition, the stem shaft 37 is provided on the bottom bridge 34 and is attached so as to be steerable by the head pipe 12 formed in the front portion of the main frame 11. Thus, the front fork 13 can be moved around the stem shaft 37.

A lower holder 38 is placed on an upper surface of the top bridge 36 and a handle 41 is fixed by this lower holder 38 and an upper holder 39. Thus, the direction of the front fork 13 can be operated by operating the handle 41.

A front fender 42 is attached inside of the left and right front fork 13 and the inner tube covers 27 are attached to both of the outsides of the left and right front fork 13 with the cover brackets 25 interposed therebetween.

Front wheel fixing members 20a to 20d are provided relative to the front wheel 14.

Figure 3:
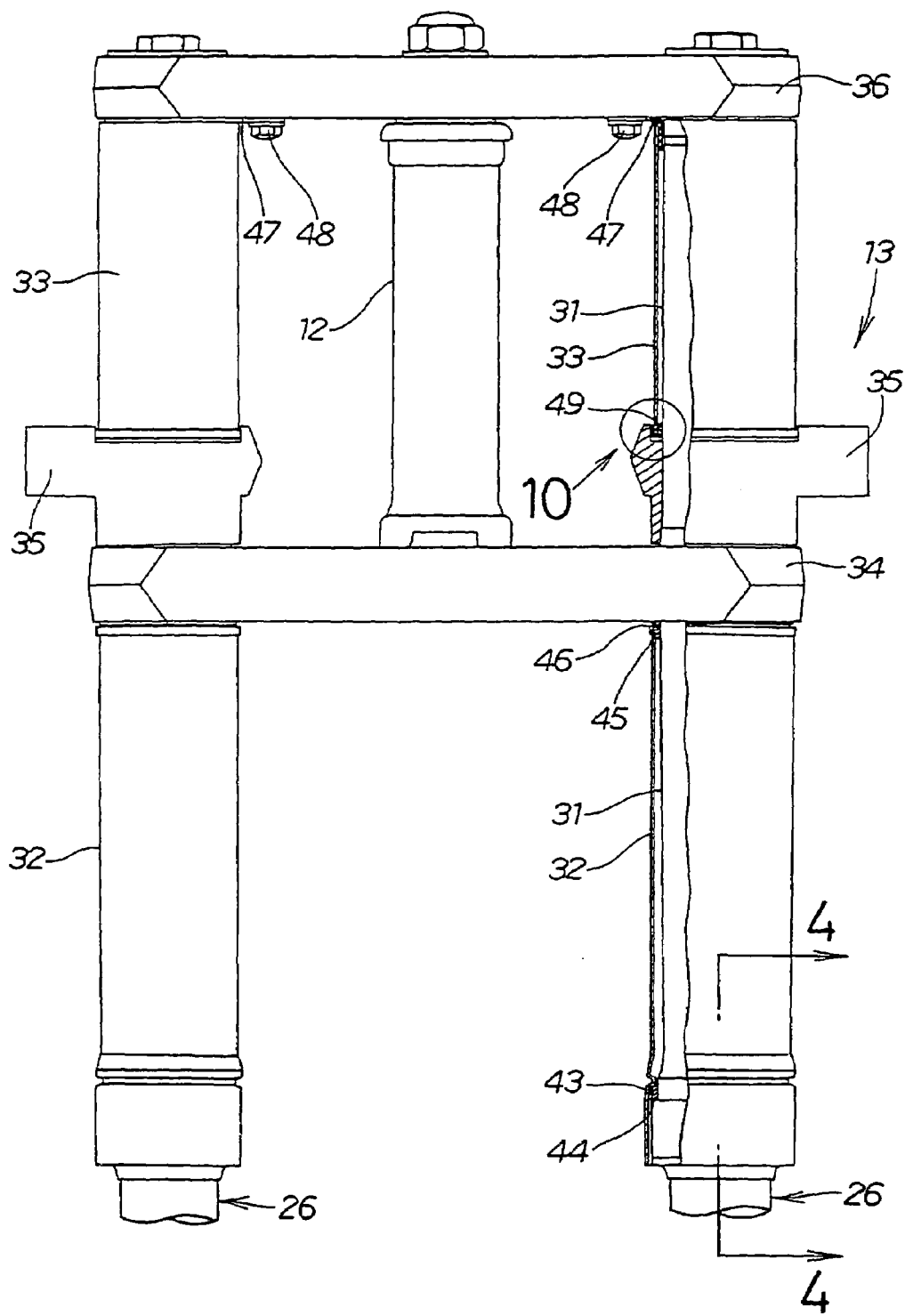
FIG. 3 is a front view of a main part of the structure of the front fork according to the present invention.

FIG. 3 is a front view of a main part of the structure of the front fork according to the present invention. The front fork 13 includes the inner tubes 26 inserted into the outer tubes 31 movably in the axial direction thereof. The tube covers 32 cover the outer tubes 31 and have their outer surfaces plated. The bottom bridge 34 is disposed on the tube covers 32.

A lower portion of each of the tube covers 32 is fixed to the outer tube 31 by means of a third elastic member 43.

The front fork uses a structure in which the lower portion of the tube cover 32 is attached to a stepped part 44 provided with the outer tube 31. However, there is no harm in changing a position of the stepped part 44 to which the outer tube 31 is provided with, as the need arises, and arbitrarily setting the position of the stepped part 44 such as attaching an upper portion of the tube cover 32, for example.

Note that a second elastic member 46 is fitted to an upper end portion 45 of the tube cover 32.

Meanwhile, an upper part of the front fork 13 includes the turn signal brackets 35 which are disposed on the bottom bridge 34 and fixed around the outer tubes 31. The upper tube covers 33 are attached on the turn signal brackets 35 and the top bridge 36 includes the upper tube covers 33 fixed thereto.

The upper tube covers 33 are attached to the top bridge 36 by means of fixed brackets 47 and bolts 48. In addition, a first elastic member 49 is fitted to a lower end portion of each of the upper tube covers 33.

Similar to the tube cover 32, the upper tube cover 33 is a member which covers the outer tube 31 and includes an outer surface that is plated.

Figure 4:
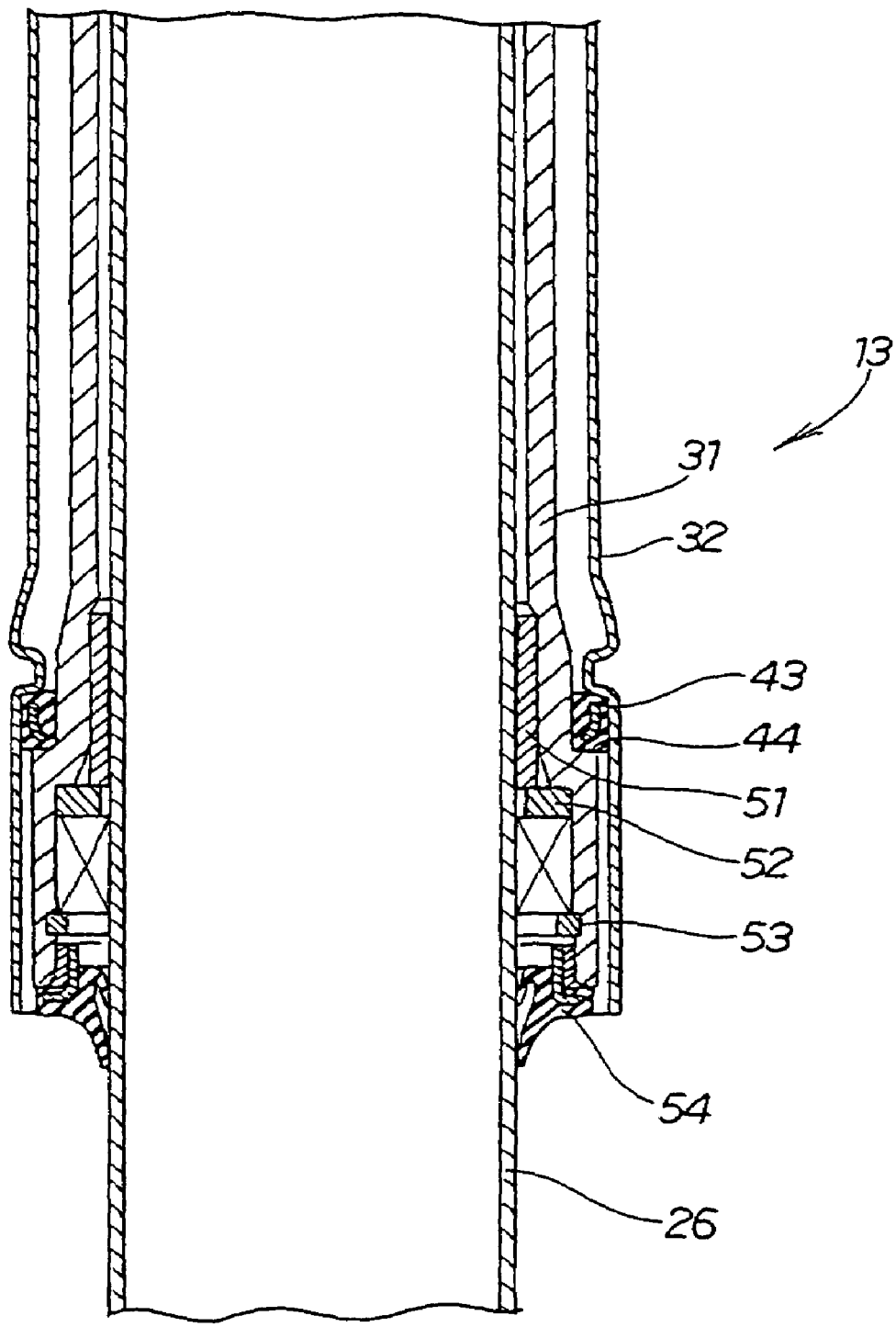
FIG. 4 is a cross-sectional view taken along the line 4—4 of FIG. 3.

FIG. 4 is a cross-sectional view taken along the line 4—4 of FIG. 3. FIG. 4 shows the outer tube 31 into which the inner tube 26 is movably inserted in the axial direction thereof. The stepped part 44 is formed in the outer tube 31 with the third elastic member 43 fitted to the stepped part 44 and the tube cover 32 of which lower portion is supported by the third elastic member 43. A surface of the tube cover 32 is subjected to a chrome plating processing.

A bushing 51 is provided together with a back up ring 52, a stopper ring 53 and a dust seal 54.

At least one of both ends of the tube cover 32 is attached to the stepped part 44 formed in the outer tube 31. Thus, in attaching the tube cover 32, the positioning of the tube cover 32 is facilitated.

As a result, the assembling efficiency of the outer tube 31 and the tube cover 32 can be improved.

Moreover, since the tube cover 32 is fixed by means of the third elastic member 43, the tube cover 32 is not bent as much as the outer tube 31.

As a result, it is possible to prevent the occurrence of cracks and peeling due to bending of a plated layer formed on the surface of the tube cover 32.

Figure 5:
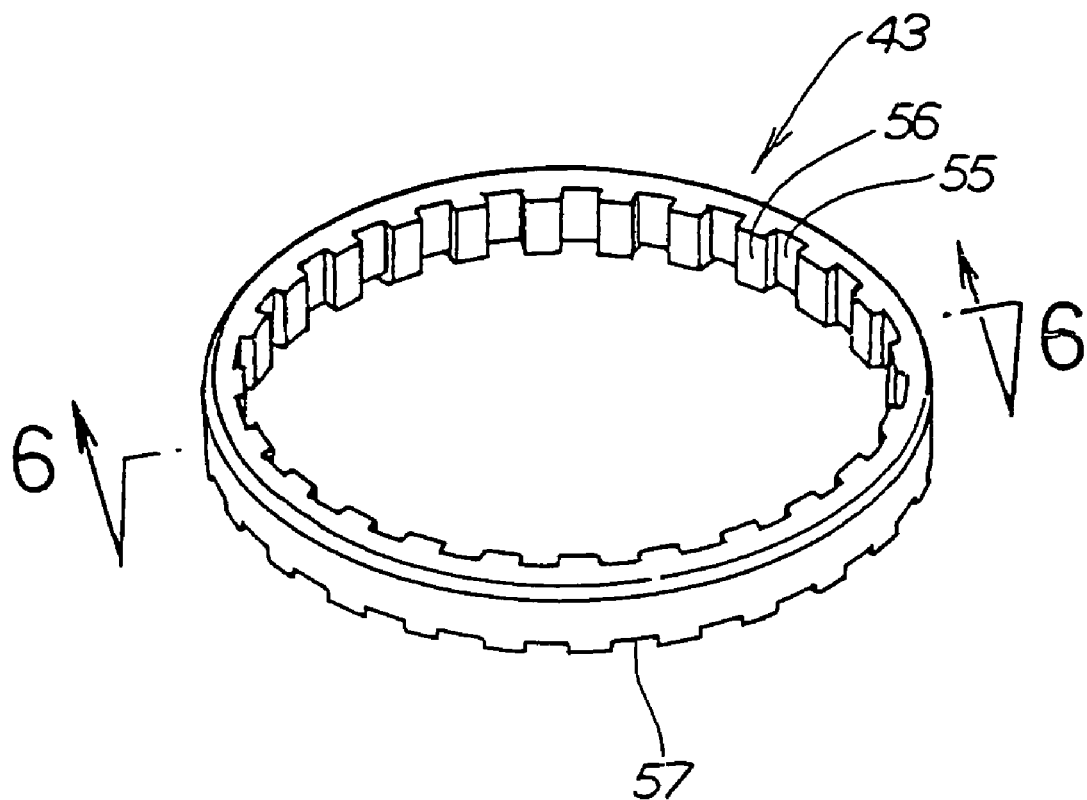
FIG. 5 is a perspective view of a third elastic member according to the present invention.

FIG. 5 is a perspective view of the third elastic member according to the present invention. The third elastic member 43 includes convex portions 56 that are formed on an inner peripheral surface 55 having a convex-concave part formed thereon. The concave portions 57 of a convex-concave part are formed on a lower surface orthogonal to the inner peripheral surface 55.

With reference to FIG. 4, the concave portions are formed on the inner peripheral surface and lower surface of the third elastic member 43. Thus, it is possible to discharge water and the like entering between the outer tube 31 and tube cover 32 of the front fork to the outside through the concave portions 57 (see FIG. 5).

In FIG. 5, a spline-shaped convex-concave part is formed on the inner peripheral surface 55 of the third elastic member 43. In addition, convex portions 56 of the convex-concave part are brought into contact with the front fork side.

The convex portions 56 and the outer tube 31 are brought into contact with each other in fitting the third elastic member 43 to the outer tube 31 (see FIG. 4). Accordingly, a contact area between the third elastic member 43 and the outer tube 31 is reduced. Thus, fitting of the third elastic member 43 can be facilitated. As a result, the assembling efficiency of the outer tube 31 and the third elastic member 43 can be improved.

The material of the third elastic member 43 may be rubber or a plastic such as resin. There is no limitation on the kind of material as long as the material is one which satisfies a predetermined strength, elasticity, durability and the like that are required for supporting the tube cover 32 (see FIG. 4).

Figure 6:
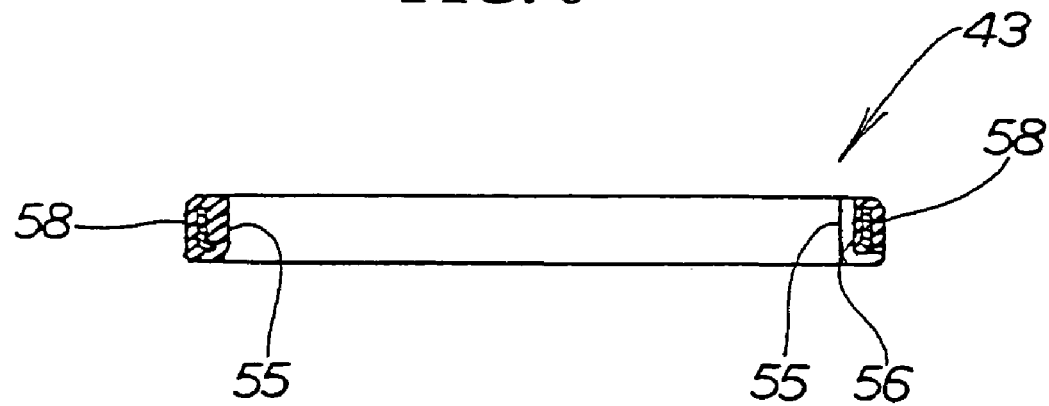
FIG. 6 is a cross-sectional view taken along the line 6—6 of FIG. 5.

FIG. 6 is a cross-sectional view taken along the line 6—6 of FIG. 5. FIG. 6 shows that a metal member 58 is sealed in the ring-shaped third elastic member 43. Since the metal member 58 is sealed in the ring-shaped inside thereof, the rigidity and durability of the third elastic member 43 can be significantly improved.

Figure 7:
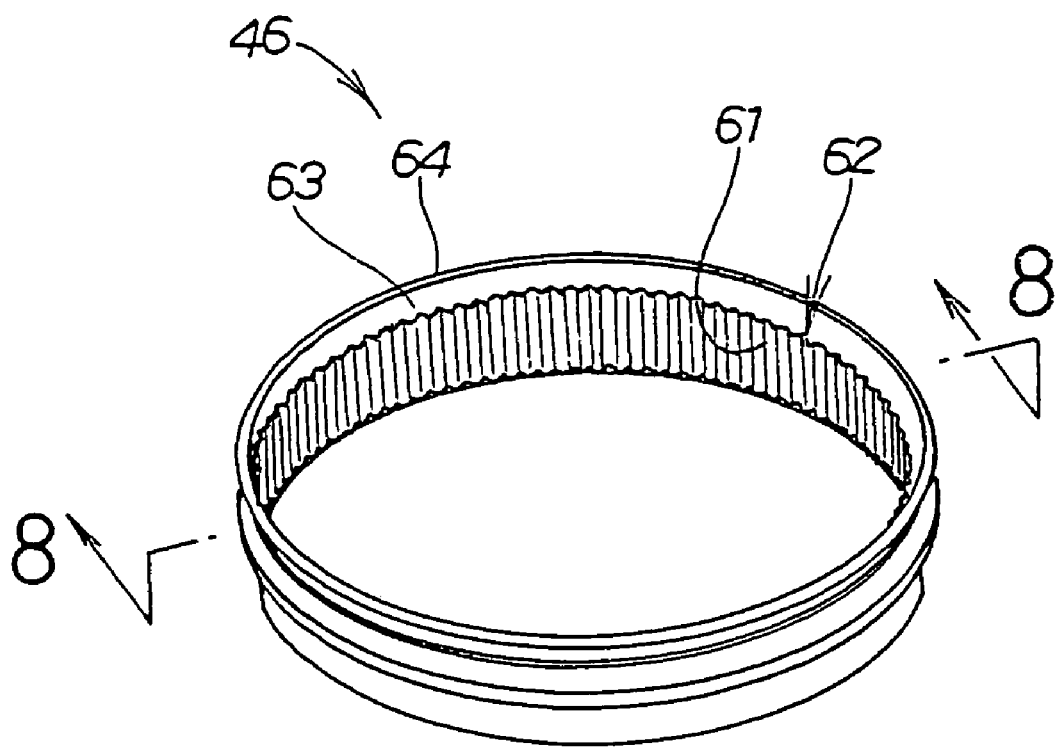
FIG. 7 is a perspective view of a second elastic member according to the present invention.

FIG. 7 is a perspective view of the second elastic member according to the present invention. In the second elastic member 46, triangular grooves 62 are formed on an inner peripheral surface 61 of the second elastic member 46 and an upper end portion 63 thereof is additionally provided with a guard-shaped lip 64.

Moreover, since the grooves 62 are formed on the inner peripheral surface 61 of the second elastic member 46, the outer tube is brought into contact with top portions of these grooves 62 in fitting the second elastic member 46 to the outer tube 31 (see FIG. 3). Accordingly, a contact area between the inner peripheral surface 61 and the second elastic member 46 is reduced. Thus, the fitting of the second elastic member 46 to the outer tube can be facilitated.

As a result, the assembling efficiency of the second elastic member 46 and the outer tube can be improved.

The material of the second elastic member 46 may be rubber or plastic such as resin. There is no limitation on the kind of material as long as the material is one which satisfies a sufficient strength, elasticity, durability and the like that are capable of fitting the second elastic member into the upper end portion of the tube cover 32 (see FIG. 3) and holding the tube cover 32 around the outer tube.

Figure 8:
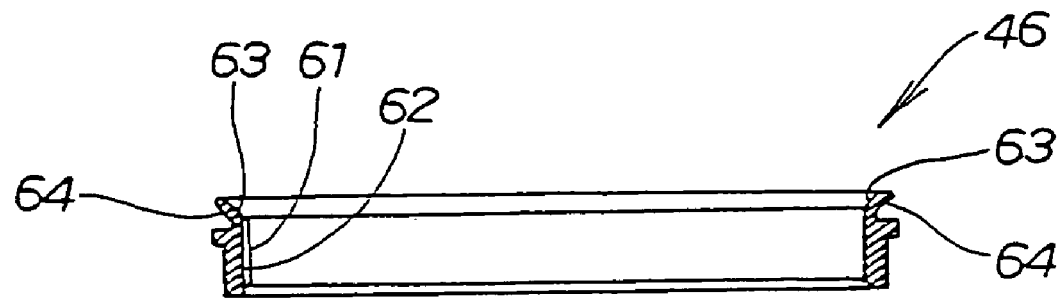
FIG. 8 is a cross-sectional view taken along the line 8—8 of FIG. 7.

FIG. 8 is a cross-sectional view taken along the line 8—8 of FIG. 7. The upper end portion 63 of the second elastic member 46 is additionally provided with the guard-shaped lip 64. In addition, this lip 64 is disposed so as to be brought into contact with the bottom bridge 34 (see FIG. 3).

The upper end portion 63 is additionally provided with the guard-shaped lip 64. Thus, even if there is some variation in a length of the tube cover 32, this variation is absorbed by the lip 64 in attaching the tube cover 32 to the outer tube 31. Accordingly, a gap between the lip 64 and the bottom bridge 34 is sealed and a predetermined sealing effect is achieved. Thus, it is possible to prevent water from entering into the tube cover 32.

Figure 9:
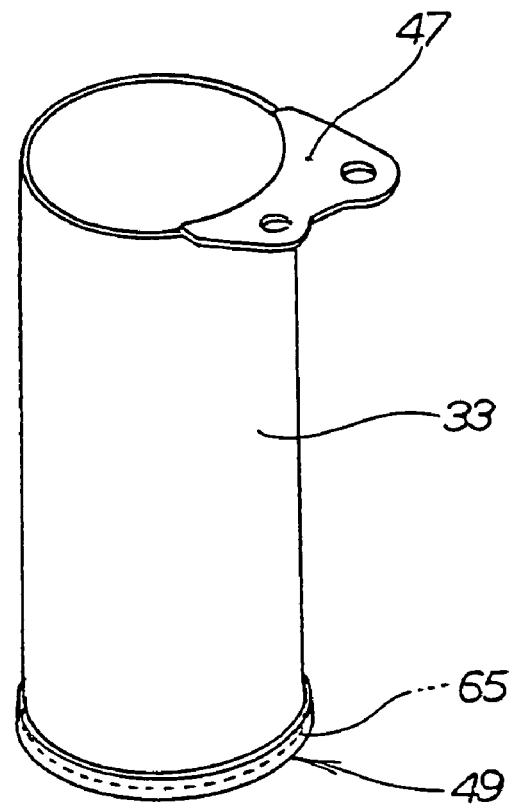
FIG. 9 is a perspective view of an upper tube cover according to the present invention.

FIG. 9 is a perspective view of the upper tube cover according to the present invention. The upper tube cover 33 includes the flange-shaped fixed bracket 47 having two holes therein in its upper end portion. The first elastic member 49 is fitted to a lower end portion 65 thereof. A surface of the upper tube cover 33 is subjected to a chrome plating processing.

The upper tube cover 33 can be fixed to a lower surface of the top bridge 36 (see FIG. 3) by means of the fixed bracket 47.

Figure 10:
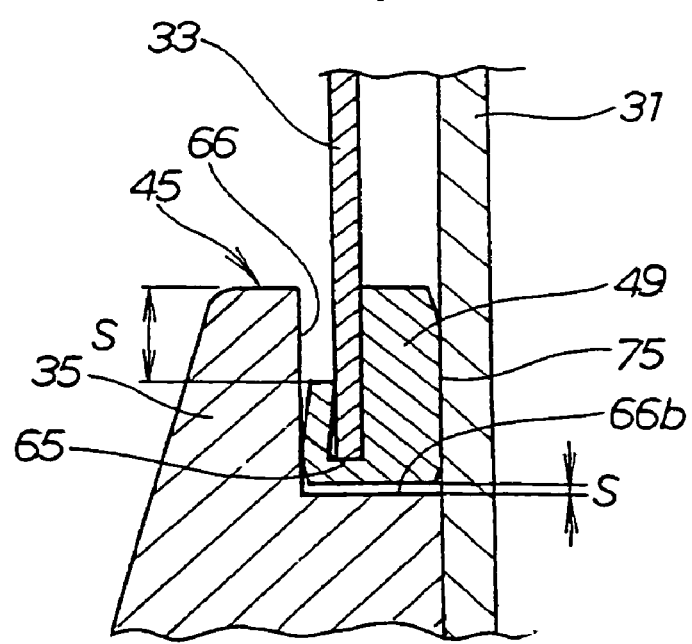
FIG. 10 is an enlarged view of an area 10 of FIG. 3.

FIG. 10 is an enlarged view of the area 10 in FIG. 3. FIG. 10 shows that the upper tube cover 33 fitted to the outer tube 31 is fitted into a groove portion 66 formed in the upper end portion 45 of the turn signal bracket 35 by means of the first elastic member 49.

By providing spaces S and S between the first elastic member 49 and the upper end portion 45 of the turn signal bracket 35 and between the first elastic member 49 and a bottom 66b of the groove portion 66 of the turn signal bracket 35, a variation in a length of the upper tube cover 33 can be absorbed.

Since the upper tube cover 33 is attached to the elastic member 49, the upper tube cover 33 is not bent as much as the front fork.

As a result, it is possible to prevent the occurrence of cracks and peeling due to bending of a plated layer formed in the upper tube cover 33.

Figure 11:
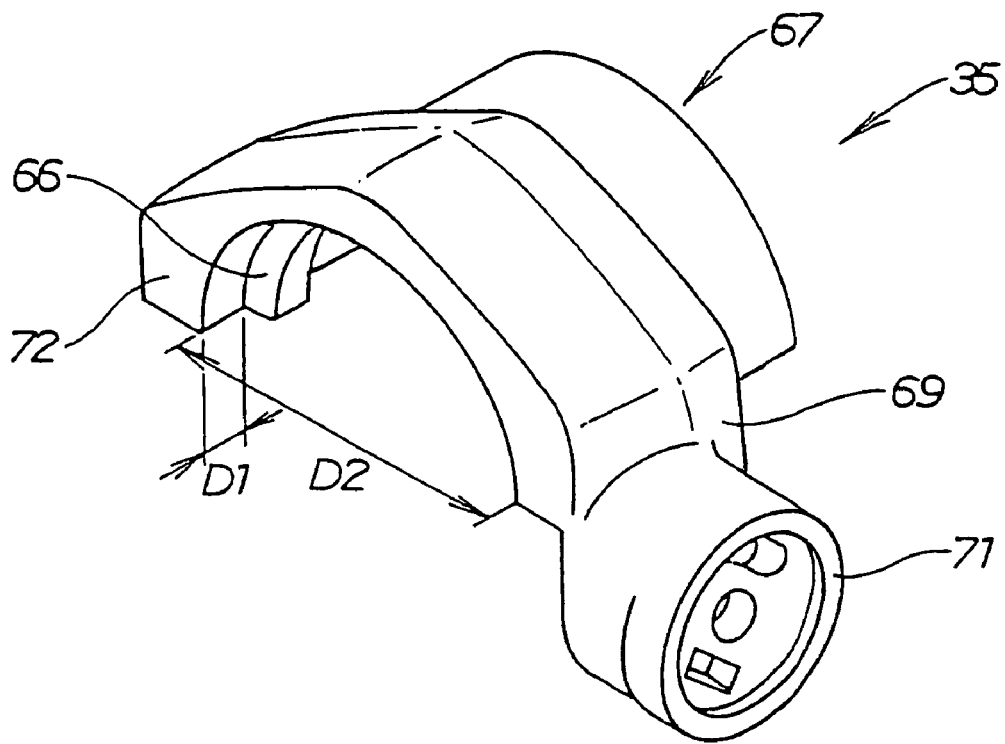
FIG. 11 is a perspective view of a front turn signal bracket according to the present invention.

FIG. 11 is a perspective view of a front turn signal bracket according to the present invention. The turn signal bracket 35 includes a front turn signal bracket 67 and a rear turn signal bracket. The front turn signal bracket 67 has a shape which is cut into halves in the axial direction of the outer tube. The turn signal 24 (see FIG. 1) can be attached to an attachment surface 71 formed on a side 69 of the bracket 67.

In order to fit the lower end portion of the upper tube cover 33 (see FIG. 3), a groove portion 66 is formed to have a diameter D2 and a depth D1 from an upper end surface 72 of the turn signal bracket 67.

Figure 12:
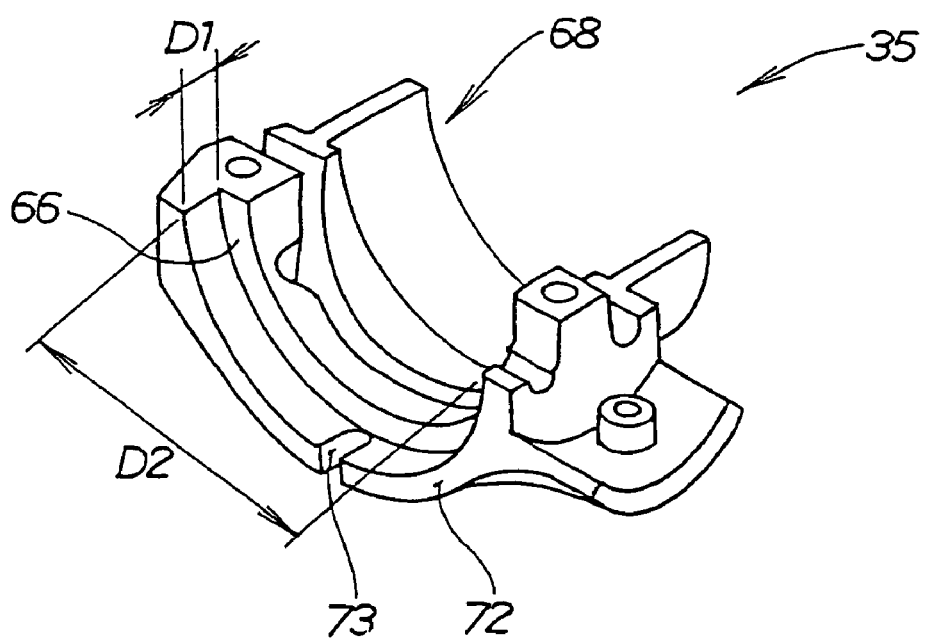
FIG. 12 is a perspective view of a rear turn signal bracket according to the present invention.

FIG. 12 is a perspective view of the rear turn signal bracket according to the present invention. The rear turn signal bracket 68 has a shape which is cut into halves in the axial direction of the unillustrated outer tube. The rear turn signal bracket 68 can be attached to the outer tube 31 (see FIG. 3) in combination with the front turn signal bracket 67 (see FIG. 11).

As in the case of the front turn signal bracket 67 (see FIG. 11), in order to fit the lower end portion of the upper tube cover 33 (see FIG. 3), a groove portion 66 is formed in an upper end surface 72 of the rear turn signal bracket 68 to have a diameter D2 and a depth D1 from the upper end surface 72. Furthermore, a notch 73 for discharging rain water accumulated in this groove portion 66 is formed.

Figure 13:
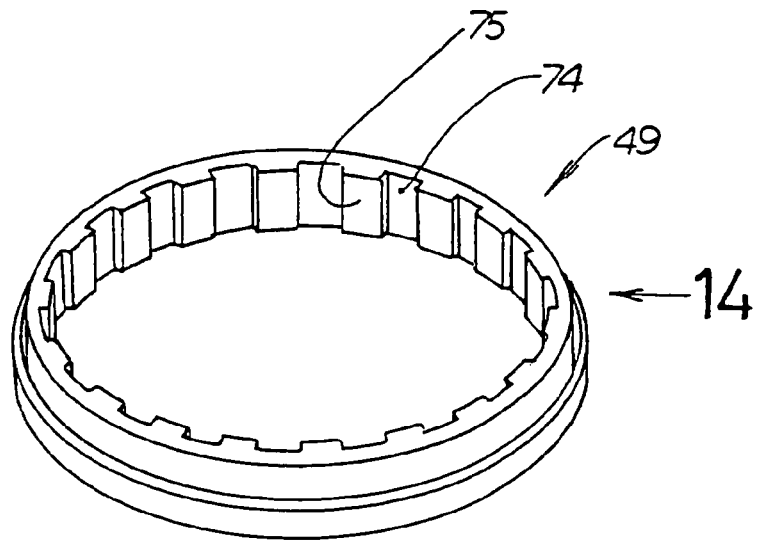
FIG. 13 is a perspective view of a first elastic member according to the present invention.

FIG. 13 is a perspective view of the first elastic member according to the present invention. FIG. 13 shows that the first elastic member 49 has convex portions 75 formed on its inner peripheral surface 74.

Since the convex portions 75 are formed on the inner peripheral surface 74 of the first elastic member 49, the convex portions 75 and the outer tube 31 (see FIG. 10) are brought into contact with each other. Accordingly, in fitting the first elastic member 49 to the outer tube 31, a contact area between the first elastic member 49 and the outer tube 31 is reduced. Thus, fitting of the first elastic member 49 to the outer tube 31 can be facilitated.

As a result, the assembling efficiency of the outer tube 31 and the first elastic member 49 can be improved.

The material of the first elastic member 49 may be rubber or a plastic such as resin. There is no limitation on the kind of material as long as the material is one which satisfies a predetermined strength, elasticity, durability and the like that are required for supporting the upper tube cover 33 (see FIG. 3).

Figure 14:
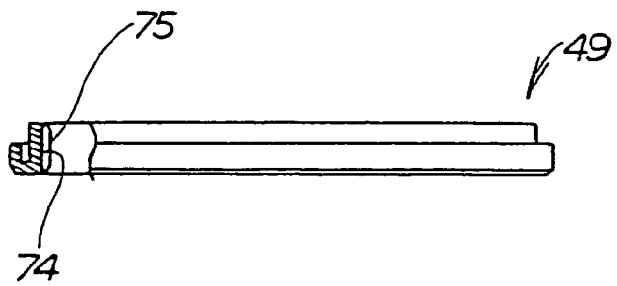
FIG. 14 is a view from a direction of the arrow 14 of FIG. 13.

FIG. 14 is a view from a direction of the arrow 14 of FIG. 13. FIG. 14 shows that the upper tube cover 33 (see FIG. 9) can be fitted to the first elastic member 49.

With reference to FIG. 10, since the convex portions 75 are formed on the inner peripheral surface of the first elastic member 49, a space (concave portions) is formed between the inner peripheral surface of the first elastic member 49 and the outer tube 31. Accordingly, even if water enters into the upper tube cover 33, the water passes through this space and reaches the groove portion 66 of the turn signal bracket 35. Thus, the water can be discharged to the outside from the notch 73 (see FIG. 12) which is formed in a part of the groove portion 66.

Figure 15:
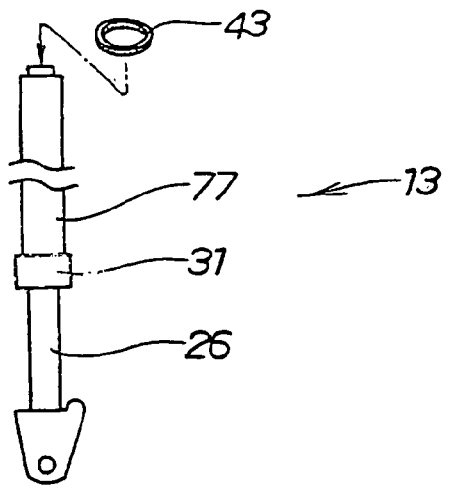
FIG. 15 is an explanatory view showing an assembly method for the third elastic member.

With reference to FIGS. 15 to 20, a method for assembling the front fork will be described below. FIG. 15 is an explanatory view showing an assembly method for the third elastic member. FIG. 15 shows that the third elastic member 43 is fitted to the outer tube 31 into which the inner tube 26 is inserted.

The spline-shaped convex-concave part is formed on the inner peripheral surface of the elastic member. Since only the convex portions are brought into contact with the front fork side, fitting can be facilitated. Thus, assembling efficiency can be improved.

Figure 16:
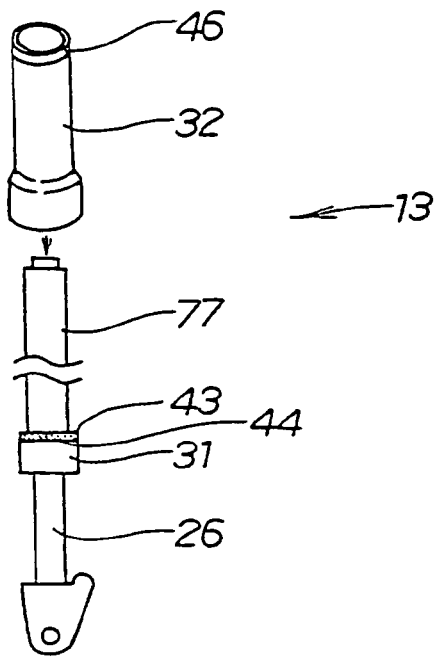
FIG. 16 is an explanatory view showing an assembly method for a tube cover.

FIG. 16 is an explanatory view showing an assembly method for the tube cover. FIG. 16 shows that the tube cover 32 includes the second elastic member 46 fitted to its upper end portion that is put on the outer tube 31 having the third elastic member 43 fitted thereto.

In attaching the tube cover, a part of the tube cover 32 is pressed against the stepped part 44 formed in the outer tube 31. Thus, the positioning of the tube cover 32 is facilitated. Accordingly, the assembling efficiency of the outer tube 31 and the tube cover 32 can be improved. In this event, it is preferable in terms of the operation that, in order to facilitate the operation of attaching the tube cover, soapy water is applied to an outer peripheral portion 77 on a side of the outer tube 31 and an outer peripheral portion of the third elastic member 43 before the attachment operation.

Figure 17:
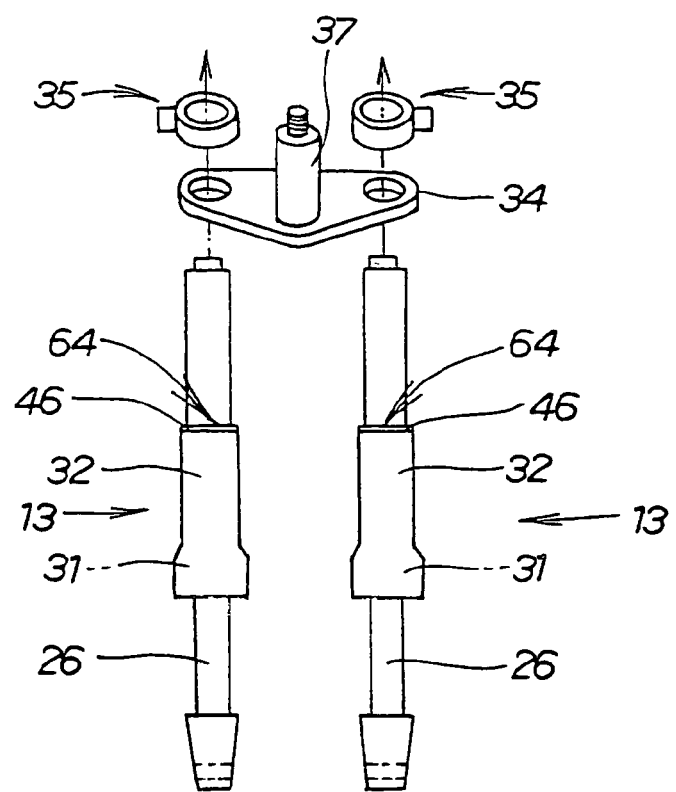
FIG. 17 is an explanatory view showing an assembly method for a bottom bridge and turn signal brackets.

FIG. 17 is an explanatory view showing an assembly method for the bottom bridge and the turn signal brackets. The bottom bridge 34 is placed on the left and right front fork 13 which includes the outer tubes 31 having the tube covers 32 put thereon and the inner tubes 26. The lower surface of the bottom bridge 34 is brought into contact with the lips 64 of the second elastic members 46 fitted to the upper end portions of the tube covers 32. Furthermore, the turn signal brackets 35 including left and right front turn signal brackets and rear turn signal brackets are attached thereto.

Figure 18:
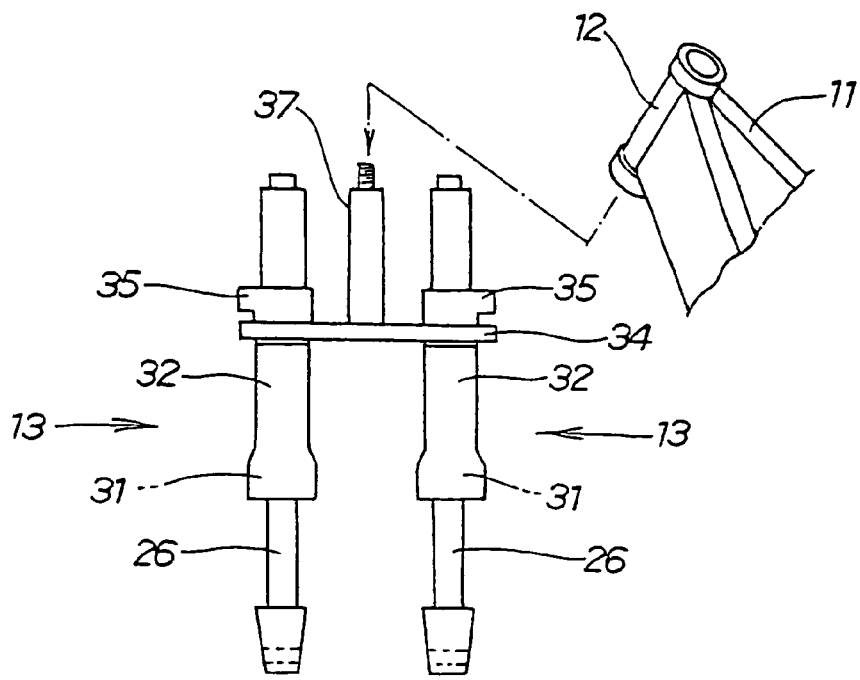
FIG. 18 is an explanatory view showing an assembly method for the bottom bridge and a head pipe.

FIG. 18 is an explanatory view showing an assembly method for the bottom bridge and the head pipe. FIG. 18 shows that the front fork 13 can be attached to the main frame 11 by inserting the stem shaft 37 placed so as to extend upwardly on the bottom bridge 34 into the head pipe 12 fixed to the front portion of the main frame 11.

Figure 19:
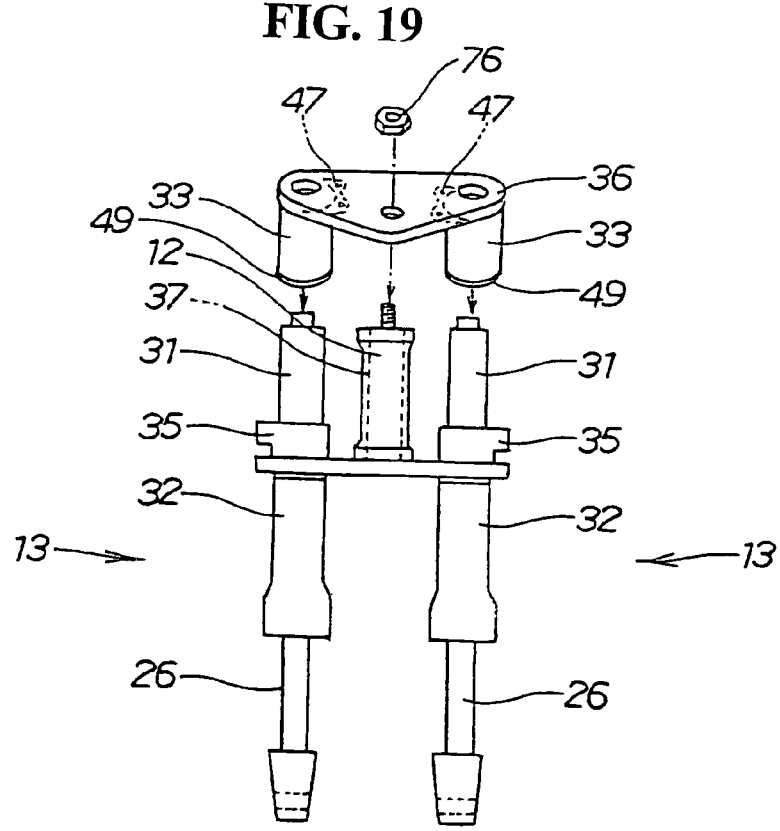
FIG. 19 is an explanatory view showing an assembly method for the upper tube cover and a top bridge.

FIG. 19 is an explanatory view showing an assembly method for the upper tube cover and the top bridge. The first elastic members 49 are previously fitted to the upper tube covers 33. The top bridge 36 having the upper tube covers 33 fixed thereto by means of the fixed brackets 47 is fitted to the left and right front fork 13 from above. Thus, the top bridge can be fixed to the front fork by use of a stem nut 76.

Figure 20:
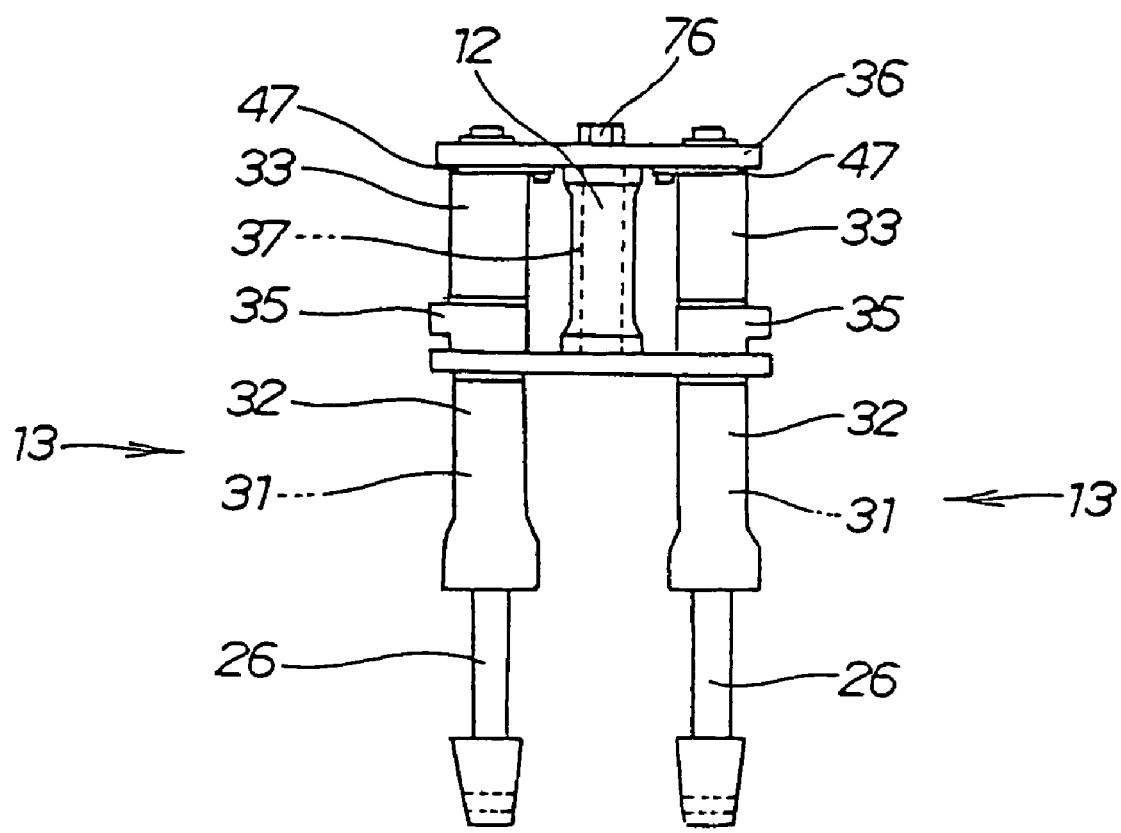
FIG. 20 is an explanatory view when assembly of the tube cover and the upper tube cover is completed.

FIG. 20 is an explanatory view when the assembly of the tube covers and the upper tube covers is completed. FIG. 20 shows that the outer tubes 31 can be covered with the tube covers 32 and the upper tube covers 33 by a series of operations of FIGS. 15 to 19.

The outer surfaces of the tube covers 32 covering the outer tubes 31 are plated. Thus, the external appearance can be enhanced. As a result, the tube covers 32 covering the outer tubes 31 and the inner tubes 26 can be plated. Consequently, the whole external appearance of the front fork 13 can be integrated.

Since the outer tubes 31 are covered with the tube covers 32 and the upper tube covers 33, light metal castings or forgings can be adopted even if the outer tubes 31 have rough surfaces.

Both of the tube covers 32 and the upper tube covers 33, which cover the outer tubes 31, are fixed to the outer tubes 31 by means of a plurality of elastic members. Thus, there is no influence on rigidity of the front fork 13.

Figure 21:
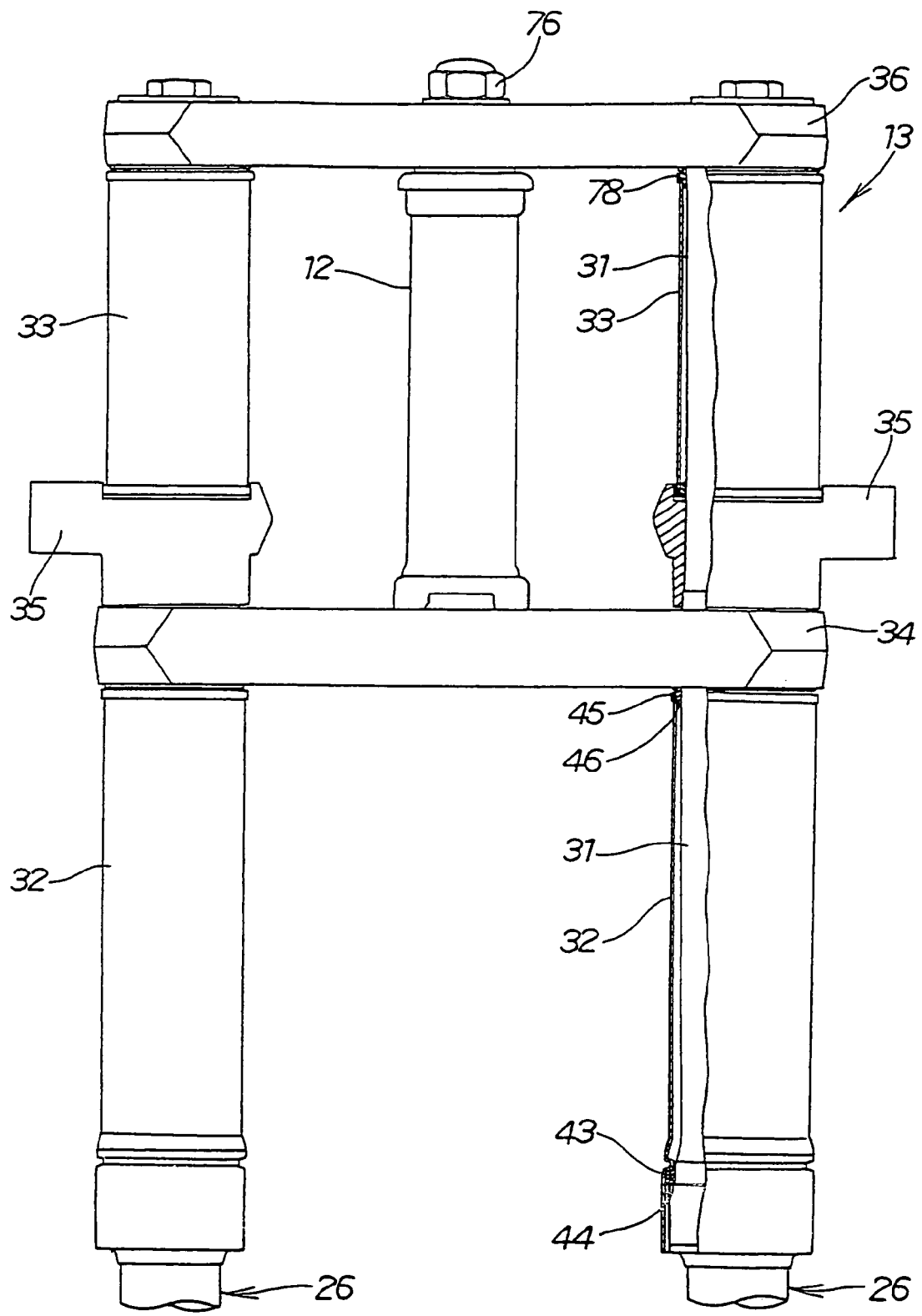
FIG. 21 is a view showing another embodiment of FIG. 3.
Figure 22:
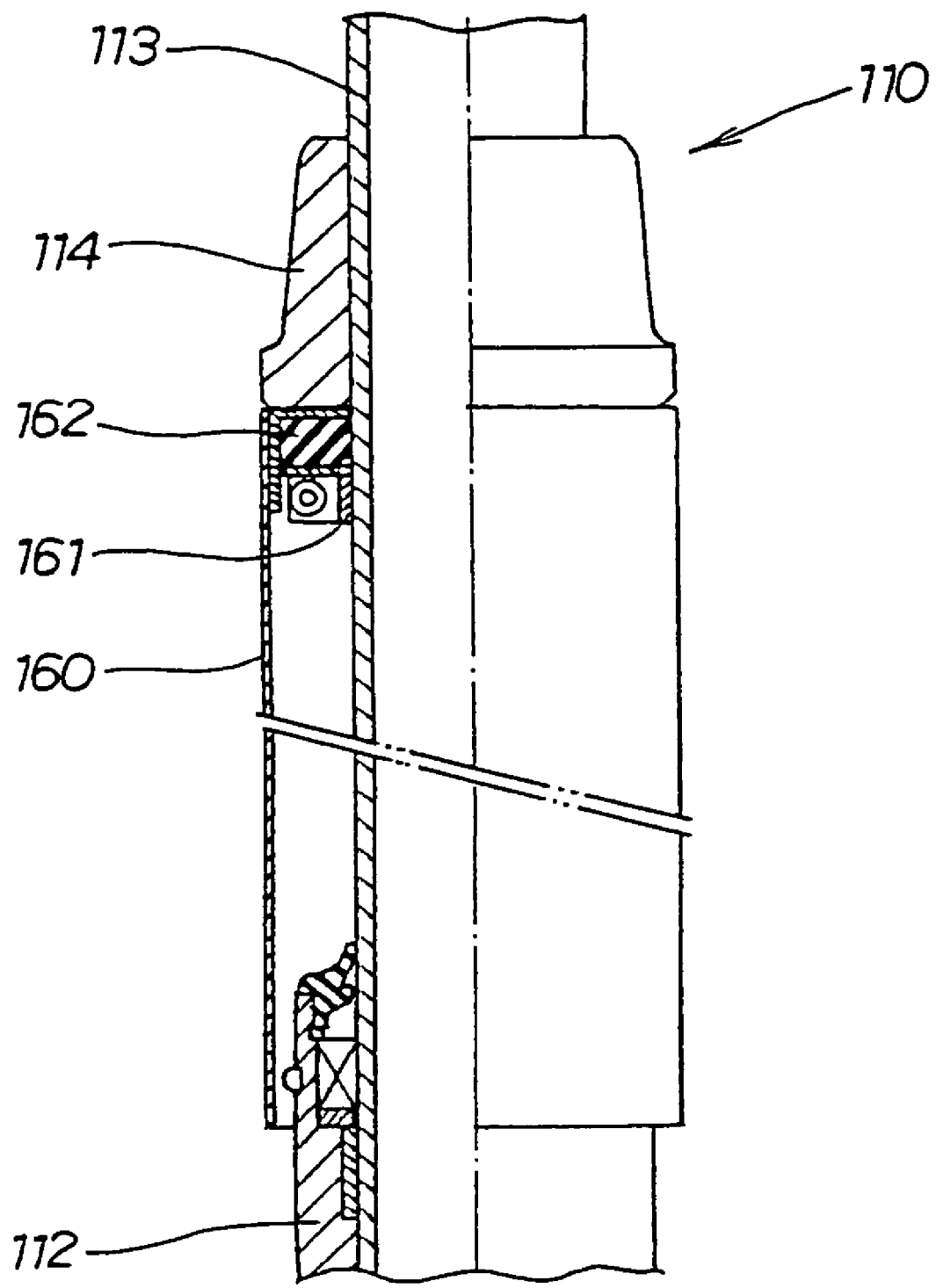
FIG. 22 is a view redisplaying patent document 1.

FIG. 21 is a view showing another embodiment of FIG. 3. FIG. 21 shows that, in an inverted front fork 13, an elastic member 78 is fitted to an upper end of an upper tube cover 33 and the upper tube cover 33 is fixed to a top bridge 36.

The upper tube cover 33 is fixed to the top bridge 36 by means of the elastic member 78. Thus, it is not required to additionally provide a fixed bracket for fixing the upper tube cover 33.

As a result, a reduction in the number of items and a weight reduction can be achieved.

Note that fixation of the upper tube cover 33 is performed by firmly fixing the upper tube cover 33 to the top bridge 36. In addition, the fixation of the tube cover 32 is performed by adding a step to the outer tube 31 and putting the tube cover 32 on the outer tube 31. However, the fixation of the upper tube cover 33 and the tube cover 32 is not limited to the combination described above but can be freely selected according to designed structures. For example, a method for firmly fixing the tube cover 32 to the bottom bridge 34 may be adopted.

Moreover, there is no harm in forming a plurality of holes such as small holes and slits in a part of the upper tube cover 33 and the tube cover 32.

Furthermore, in the described embodiment, the surfaces of the upper tube cover 33 and the tube cover 32 are subjected to a hard chrome plating processing. However, other plating processes can be arbitrarily selected.

With the foregoing configuration, the present invention exerts the following effects.

According to the present invention, an outer tube of a front fork supporting a front wheel is covered with a tube cover and an outer surface of this tube cover is plated. Since the outer surface of the tube cover which covers the outer tube is plated, the external appearance can be enhanced.

As a result, the tube cover, which covers the outer tube, and an inner tube can be plated. Thus, the whole external appearance of the front fork can be integrated.

In addition, since the outer tube is covered with the tube cover, a light metal castings or forgings can be adopted even if the outer tube has a rough surface.

According to the present invention, the tube cover is attached to the front fork side with an elastic member interposed therebetween. Thus, it is possible to prevent the occurrence of cracks and peeling due to bending of a plated layer formed in the tube cover.

According the present invention, at least one of both ends of the tube cover is attached to a stepped part which the outer tube is provided with. Since one end of the tube cover is attached to the stepped part formed in the outer tube, in attaching the tube cover, positioning of the tube cover is facilitated. Thus, the assembling efficiency of the outer tube and the tube cover can be improved.

According to the present invention, a convex-concave part is formed on an inner peripheral surface of the elastic member. In addition, convex portions are brought into contact with the front fork side. Since the convex portions are formed on the inner peripheral surface, it is possible to reduce force required to fit the elastic member into the outer tube.

As a result, the assembling efficiency of the elastic member and the outer tube can be improved.

Furthermore, since concave portions are formed on the inner peripheral surface, it is possible to easily discharge rain water entering between the tube cover and the front fork through the concave portions.

According to the present invention, a top bridge or a bottom bridge of the inverted front fork fixes one end of the tube cover. Since the top bridge or the bottom bridge fixes the one end of the tube cover, it is not required to provide an additional member for fixing the tube cover. As a result, a reduction in the number of items and weight reduction can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front fork supporting a front wheel includes a pair of inner tubes that are respectively inserted into a pair of left and right outer tubes movably in an axial direction thereof, comprising:
   a tube cover for covering the outer tube of the front fork, an outer surface of the tube cover is plated.

2. The structure of the front fork according to claim 1, wherein the tube cover is attached to a front fork side with an elastic member interposed therebetween.

3. The structure of the front fork according to claim 1, wherein at least one of both ends of the tube cover is attached to a stepped part which is provided on the outer tube.

4. The structure of the front fork according to claim 2, wherein at least one of both ends of the tube cover is attached to a stepped part which is provided on the outer tube.

5. The structure of the front fork according to claim 1, wherein a convex-concave part is formed on an inner peripheral surface of the elastic member and convex portions are brought into contact with the front fork side.

6. The structure of the front fork according to claims 2, wherein a convex-concave part is formed on an inner peripheral surface of the elastic member and convex portions are brought into contact with the front fork side.

7. The structure of the front fork according to claim 1, wherein the front fork is an inverted front fork in which inner tubes are inserted from below outer tubes and any one of a top bridge and a bottom bridge of the inverted front fork fixes one end of the tube cover.

8. The structure of the front fork according to claim 2, wherein the front fork is an inverted front fork in which inner tubes are inserted from below outer tubes and any one of a top bridge and a bottom bridge of the inverted front fork fixes one end of the tube cover.

9. The structure of the front fork according to claim 3, wherein the front fork is an inverted front fork in which inner tubes are inserted from below outer tubes and any one of a top bridge and a bottom bridge of the inverted front fork fixes one end of the tube cover.

10. The structure of the front fork according to claim 4, wherein the front fork is an inverted front fork in which inner tubes are inserted from below outer tubes and any one of a top bridge and a bottom bridge of the inverted front fork fixes one end of the tube cover.

11. A front fork adapted to support a front wheel comprising:
    a pair of inner tubes inserted, respectively, into a pair of left and right outer tubes movably in an axial direction thereof;
    a tube cover for covering each of the left and right outer tubes, said tube cover including an outer surface that is plated.

12. The structure of the front fork according to claim 11, wherein the tube cover is attached to a front fork side with an elastic member interposed therebetween.

13. The structure of the front fork according to claim 11, wherein at least one of both ends of the tube cover is attached to a stepped part which is provided on the outer tube.

14. The structure of the front fork according to claim 12, wherein at least one of both ends of the tube cover is attached to a stepped part which is provided on the outer tube.

15. The structure of the front fork according to claim 11, wherein a convex-concave part is formed on an inner peripheral surface of the elastic member and convex portions are brought into contact with the front fork side.

16. The structure of the front fork according to claims 12, wherein a convex-concave part is formed on an inner peripheral surface of the elastic member and convex portions are brought into contact with the front fork side.

17. The structure of the front fork according to claim 11, wherein the front fork is an inverted front fork in which inner tubes are inserted from below outer tubes and any one of a top bridge and a bottom bridge of the inverted front fork fixes one end of the tube cover.

18. The structure of the front fork according to claim 12, wherein the front fork is an inverted front fork in which inner tubes are inserted from below outer tubes and any one of a top bridge and a bottom bridge of the inverted front fork fixes one end of the tube cover.

19. The structure of the front fork according to claim 13, wherein the front fork is an inverted front fork in which inner tubes are inserted from below outer tubes and any one of a top bridge and a bottom bridge of the inverted front fork fixes one end of the tube cover.

20. The structure of the front fork according to claim 14, wherein the front fork is an inverted front fork in which inner tubes are inserted from below outer tubes and any one of a top bridge and a bottom bridge of the inverted front fork fixes one end of the tube cover.

* * * * *